United States Patent
Moschini

[19]

[11] Patent Number: 6,053,186
[45] Date of Patent: Apr. 25, 2000

[54] MACHINE FOR REMOVING SALT CORES TRAPPED IN PRESSURE DIE-CAST OR INJECTION MOULDED ARTICLES

[75] Inventor: Renzo Moschini, Bologna, Italy

[73] Assignee: Magneti Marelli S.p.A., Milan, Italy

[21] Appl. No.: 09/170,285

[22] Filed: Oct. 13, 1998

[30] Foreign Application Priority Data

Oct. 14, 1997 [IT] Italy ................................ BO97A0613

[51] Int. Cl.⁷ ...................................................... B08B 3/02
[52] U.S. Cl. .............................................. 134/72; 134/109
[58] Field of Search ............................... 134/68, 72, 109; 451/40

[56] References Cited

U.S. PATENT DOCUMENTS

| | | | |
|---|---|---|---|
| 1,896,149 | 2/1933 | Zademach ............................... | 134/68 X |
| 2,698,627 | 1/1955 | Kearney et al. ........................ | 134/72 X |
| 3,607,482 | 9/1971 | Selm ..................................... | 134/109 X |
| 4,570,693 | 2/1986 | Barlow . | |
| 4,752,283 | 6/1988 | Copeland et al. .................... | 134/109 X |
| 5,128,192 | 7/1992 | Narasaki . | |

FOREIGN PATENT DOCUMENTS

| | | |
|---|---|---|
| 0192507A | 8/1986 | European Pat. Off. . |
| 0314156A | 5/1989 | European Pat. Off. . |
| 0471459A1 | 2/1992 | European Pat. Off. . |
| 0613742A | 7/1994 | European Pat. Off. . |
| 2624040 | 6/1989 | France . |
| WO93/25365 | 12/1993 | WIPO . |

*Primary Examiner*—Philip R. Coe
*Attorney, Agent, or Firm*—Hall, Priddy & Myers

[57] ABSTRACT

Machine for removing salt cores from pressure die-cast or injection molded articles, having a washing tunnel, inside which there are a plurality of washing stations, and a conveyor designed to advance the articles one after the other through each washing station where a plurality of nozzles, pointing in a plurality of directions, project jets of a saline solution which is saturated or supersaturated with the same salt as that used to make the cores, on to the articles; the machine also having a tank, positioned underneath the conveyor, to recover the supersaturated saline solution containing, in suspension, the salt from which the above-mentioned cores are made, a pump for conveying the saline solution contained in the tank to the nozzles and, lastly, a filtering device for recovering the excess salt in suspension in the tank.

7 Claims, 1 Drawing Sheet

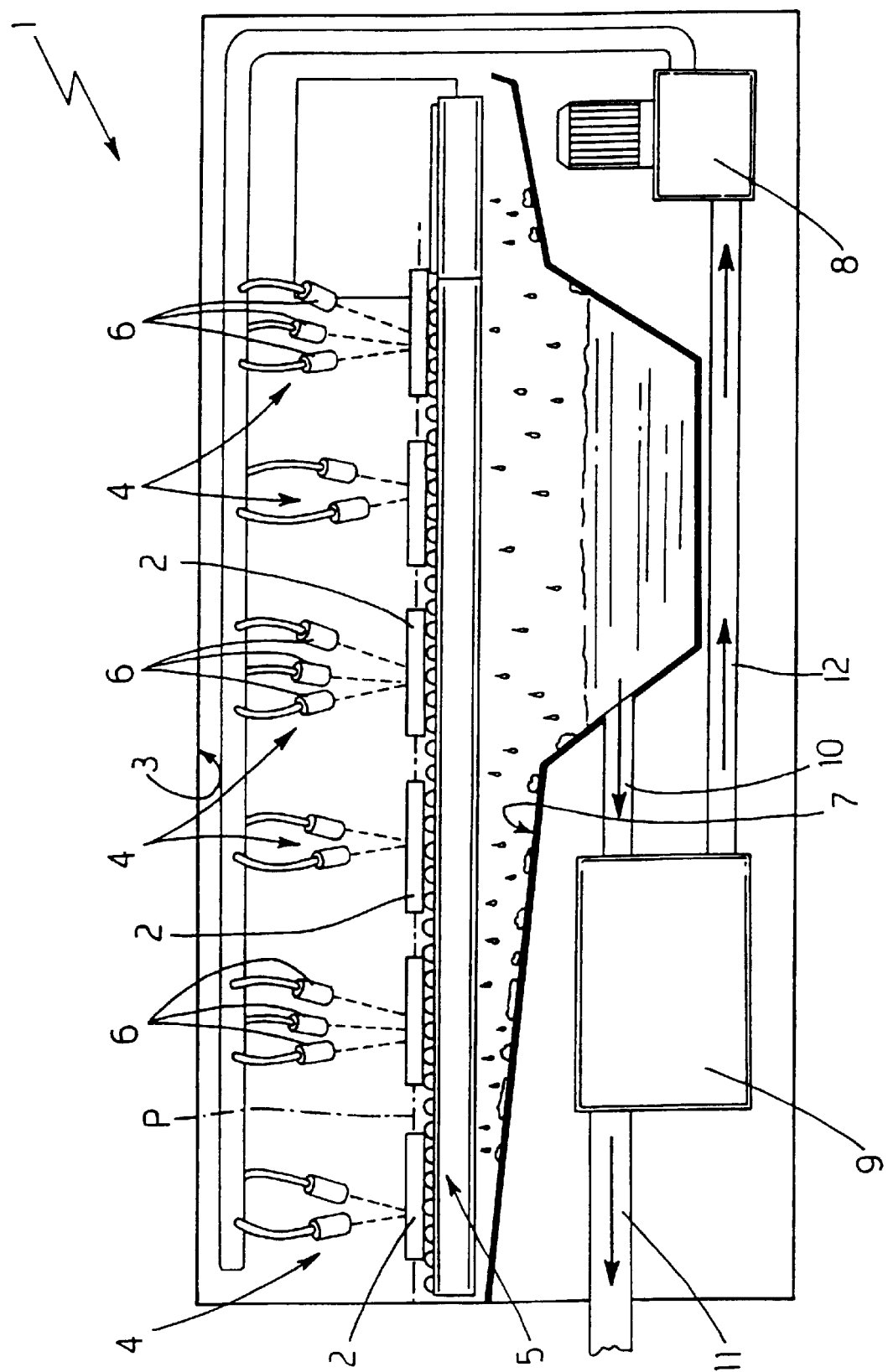

MACHINE FOR REMOVING SALT CORES TRAPPED IN PRESSURE DIE-CAST OR INJECTION MOULDED ARTICLES

BACKGROUND OF THE INVENTION

The present invention relates to a machine for removing salt cores trapped within pressure die-cast or injection moulded articles.

As is known, pressure die-cast or injection moulded articles are produced by injecting a material in liquid form—either a metal (for example aluminium) or a plastic (for example polyamides)—into a mould bearing a negative impression of the desired article. It is common practice, moreover, to place one or more cores inside the mould so as to produce articles with cavities and/or apertures of a particular shape.

For some time now, in order to overcome the problems connected with the need to extract the cores from within the article once the material injected into the mould has solidified, successful use has been made of cores obtained by compressing salt grains (for example sodium chloride grains) inside moulds bearing a negative impression of the core shape. Indeed, such a solution would enable the cores trapped within the article to be removed simply by washing the said article with a liquid solvent (for example water) capable of dissolving the salt grains.

However, the use of salt cores in the mass-production of the abovementioned pressure die-cast or injection moulded articles is very much limited by the difficulties encountered in removing the salt cores from within the article quickly. At present, removing the salt cores from within the article is achieved by immersing the article in the liquid solvent for however long is needed to completely dissolve the salt grains (usually several tens of hours).

Applying such a solution to a mass-production process is obviously unfeasible since it would mean that tanks would have to be available capable of containing at least as many articles as the number of articles produced in the time needed to dissolve the salt cores.

SUMMARY OF THE INVENTION

The object of the present invention is to provide a machine capable of rapidly removing the salt cores that remain trapped inside the articles once the latter have solidified.

According to the present invention, a machine is provided for removing salt cores trapped in pressure die-cast or injection moulded articles, characterized in that it comprises a washing tunnel, inside which there are a plurality of washing stations, a conveyor designed to advance the said articles one after the other through each of the said washing stations and a plurality of nozzles designed to project jets of saline solution on to the articles located in the said washing stations.

BRIEF DESCRIPTION OF THE DRAWING

The present invention will now be described with reference to the appended drawing which diagrammatically illustrates a machine for removing salt cores constructed according to the teachings of the present invention.

DETAILED DESCRIPTION OF THE INVENTION

With reference to the appended FIGURE, the reference numeral 1 denotes a machine designed to remove the salt cores that have remained trapped within the articles from pressure die-cast or injection moulded articles 2.

The machine 1 comprises a washing tunnel 3, inside which there are a plurality of washing stations 4, and a conveyor 5 designed to advance the articles 2 stepwise and one after the other inside the washing tunnel 3 along a path P that passes successively through all the washing stations 4.

Each washing station 4 in the machine 1 has a plurality of nozzles 6 pointing in a plurality of directions, each of which is designed to spray one or more jets of a saline solution—preferably, but not necessarily, containing the same salt as that used to make the abovementioned cores—at high pressure on to the articles 2 carried by the conveyor 5. These jets of saline solution are designed to break up the salt cores that have remained trapped within the articles 2.

The said saline solution is, in particular, a saline solution which is saturated or supersaturated with salt so as to exploit the natural tendency of a salt in suspension in a supersaturated salt solution to precipitate, thereby making it easier to recover the salt that makes up the abovementioned cores.

The machine 1 also comprises a recovery tank 7 located underneath the conveyor 5 to recover the saline solution which has been sprayed on to the articles 2 and which thus carries, in suspension, the salt from which the abovementioned cores are made; a pump unit 8 designed to draw the saline solution from the recovery tank 7 so as to convey it to the nozzles 6 at a given pressure; and, lastly, a filtering device 9 designed to extract the excess salt produced by the dissolution of the salt cores from the saline solution collected in the recovery tank 7.

If a saline solution saturated with salt is used, the salt cores are broken up by the mechanical action of the jets alone and the supersaturated saline solution is only produced in the recovery tank 7 into which the salt that makes up the cores also flows.

If a saline solution supersaturated with salt is used, the salt cores are broken up by both the mechanical action of the jets and by the abrasive action of the salt suspended in the said supersaturated saline solution and a supersaturated saline solution having a higher percentage of salt than that coming out of the nozzles 6 is formed inside the recovery tank 7.

Given that the recovery tank 7 contains a supersaturated saline solution in any case, a centrifugal filter of the type currently used in the optics industry for recovering cerium oxide from processing waters can effectively be used as a filtering device 9. The supersaturated saline solution leaves the recovery tank 7 via a delivery pipe 10 and is conveyed to the centrifugal filter which separates the salt in suspension from the supersaturated saline solution, the salt being discharged through a discharge pipe 11 and the filtered saline solution being fed to the pump unit 8 through a return pipe 12.

According to a variant embodiment which is not illustrated, the centrifugal filter discharges the filtered saline solution directly into the recovery tank 7 and the pump unit 8 sucks the saline solution directly out of the said recovery tank 7.

The way in which the machine 1 works can be easily deduced from the above description and does not, therefore, require any further explanation.

The main advantage of the machine 1 is that it is capable of removing the cores trapped within the articles in a relatively short period of time (in experiments the process has taken approximately tens of minutes), and can therefore be efficiently used to remove cores in a plant for producing pressure die-cast or injection moulded articles that uses salt cores.

From the point of view of using salt cores to mass-produce pressure die-cast or injection moulded articles, the machine 1 can effectively be combined with a conventional machine for washing articles, such as for example the SYNCRO 02/1000 washing machine produced by PA-DA S.N.C., so as to provide a unit for cleaning and washing articles which is capable of receiving articles containing salt cores trapped within them and outputting perfectly clean articles from which the salt cores have been removed.

In conclusion, it should be clear that modifications and variations can be made to the machine 1 described and illustrated herein without thereby departing from the scope of the present invention.

What is claimed is:

1. Machine (1) for removing salt cores trapped in pressure die-cast or injection moulded articles (2), characterized in that it comprises a washing tunnel (3), inside which there are a plurality of washing stations (4), a conveyor (5) designed to advance the said articles (2) one after the other through each of the said washing stations (4) and a plurality of nozzles (6) designed to project jets of saline solution on to the articles (2) located in the said washing stations (4).

2. Machine according to claim 1, characterized in that it comprises a recovery tank (7) located underneath the said conveyor (5) to recover the saline solution which has been projected on to the articles (2) and the salt making up the said salt cores, and a pump unit (8) designed to draw the saline solution from the said recovery tank (7) so as to convey it to the said nozzles (6) at a given pressure.

3. Machine according to claim 1,
   characterized in that the saline solution coming out of the said nozzles (6) is a saline solution which is saturated with salt, containing in solution the same salt as that used to make the said salt cores.

4. Machine according to claim 3, characterized in that the saline solution contained in the recovery tank (7) is a supersaturated saline solution.

5. Machine according to claim 4, characterized in that it comprises a filtering device (9) designed to extract part of the salt suspended in the said solution from the supersaturated saline solution contained in the recovery tank (7).

6. Machine according to claim 5, characterized in that the said filtering device (9) is a centrifugal filter designed to receive the said supersaturated saline solution from the said recovery tank (7), to draw out the salt suspended in the supersaturated saline solution, and to discharge a saturated saline solution into the recovery tank (7).

7. Machine according to claim 1,
   characterized in that the saline solution coming out of the said nozzles (6) is a saline solution which is supersaturated with salt, containing in suspension the same salt as that used to make the said cores.

\* \* \* \* \*